United States Patent [19]

Zinnen et al.

[11] 4,362,201
[45] Dec. 7, 1982

[54] TREAD PROFILE FOR PNEUMATIC VEHICLE TIRES

[75] Inventors: Norbert Zinnen, Aachen, Fed. Rep. of Germany; Henri J. Mirtain, Compiegne, France; Harm J. Arends, Voerendaal, Netherlands

[73] Assignee: Uniroyal Englebert Reifen GmbH, Aachen, Fed. Rep. of Germany

[21] Appl. No.: 243,712

[22] Filed: Mar. 16, 1981

[30] Foreign Application Priority Data

Mar. 15, 1980 [DE] Fed. Rep. of Germany ... 8007151[U]

[51] Int. Cl.³ .............................................. B60C 11/06
[52] U.S. Cl. ................................................ 152/209 R
[58] Field of Search ...................... 152/209 R, 209 D; D12/142, 143, 144

[56] References Cited

U.S. PATENT DOCUMENTS

| D. 228,889 | 10/1973 | Boileau | D12/142 |
| D. 235,535 | 6/1975 | Holmes | D12/142 |
| 3,409,064 | 11/1968 | Leonard | 152/209 R |
| 3,556,191 | 1/1971 | Mills | 152/209 R |
| 3,682,220 | 8/1972 | Vadien | 152/209 R |
| 3,841,374 | 10/1974 | Boileau | 152/209 R |

FOREIGN PATENT DOCUMENTS 2056925 5/1981 United Kingdom ........... 152/209 D

Primary Examiner—Michael W. Ball
Attorney, Agent, or Firm—Becker & Becker, Inc.

[57] ABSTRACT

A pneumatic vehicle tire having a tread provided with profiled ribs extending continuously in the circumferential direction, and with circumferential continuous grooves which separate the profiled ribs from each other. A plurality of meandering profiled ribs are provided, and their laterally outer side edges have obtuse-angled serrations or toothing. Inwardly, these ribs are provided with linearly extending blind grooves which are oriented at an angle to the circumferential direction. Block-rib parts are formed with an inclined gable embodiment. Furthermore, the circumferential grooves have a zig-zag shape.

16 Claims, 2 Drawing Figures

TREAD PROFILE FOR PNEUMATIC VEHICLE TIRES

The present invention relates to a pneumatic vehicle tire having a tread provided with profiled ribs extending continuously in the circumferential direction, as well as with circumferential continuous grooves which separate the profiled ribs from each other.

It is an object of the present invention, with such a tread-rib profile, for pneumatic vehicle tires with substantially an enlarged raised tread surface, to improve the tread groove stability (nibbling), when passing over tracks, for instance, in the axial direction by special block-rib members, and also to thereby improve the driving behavior or handling in general, as well as to thereby simultaneously provide a functionally safe system for receiving and discharging water (i.e. water drainage) from the tread profile.

Figure 1:
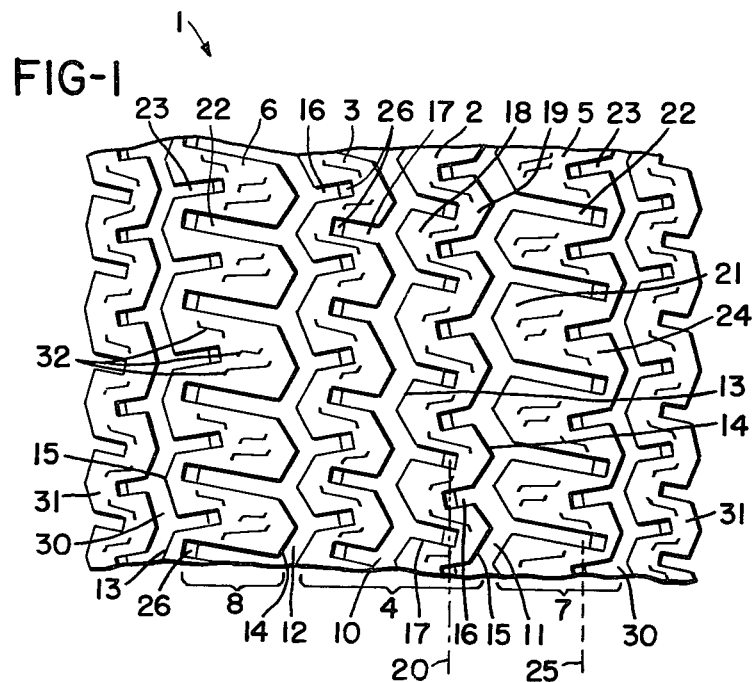
Figure 2:
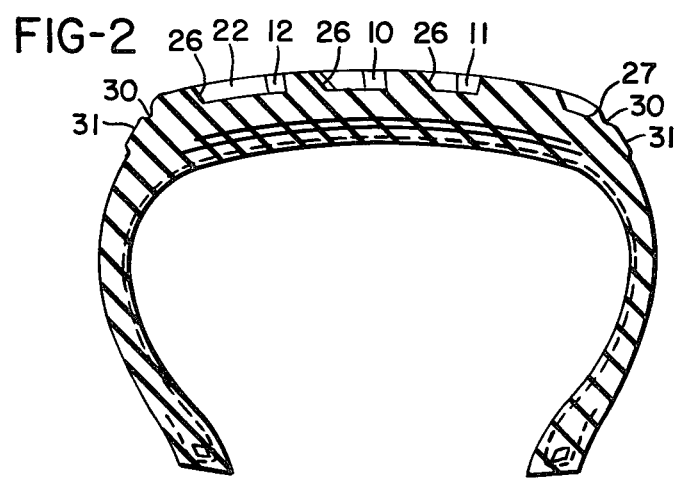

This object, and other objects and advantages of the present invention, will appear more clearly from the following specification in connection with the accompanying drawing, in which:

FIG. 1 is a top or plan view of a tread profile according to the present invention; and FIG. 2 is a partial cross section of the pneumatic tire with the inventive tread profile.

The tread of the present invention is characterized primarily by a plurality of meandering profiled ribs, the laterally outer side edges of which are serrated or toothed in outline and are obtuse-angled; inwardly, these ribs are provided with substantially linearly extending blind grooves which are oriented at an angle to the circumferential direction; block-rib parts are formed with an inclined gable or inclined triangular-wall-shaped configuration like ends of a pitched roof; and furthermore, the circumferential grooves have a zig-zag shape.

With such a serrated or toothed meandering rib profile, with pneumatic vehicle tires having a wide tread or raised surface, particularly in the "70" series, not only the general guiding and steering behavior—the exact reaction to maximum angle of turn and problem-free return—but also the tread groove stability (nibbling, i.e., the force and moment behavior of tires over edges, such as tracks) during traversing or passing over track grooves, for example of streetcar rails, is considerably improved. This is true because in every phase of the tire use, a number of continuously connected block-rib segments are present. These segments comprise edges and block-rib parts oriented essentially in the important inclined directions as a consequence of their structural character. The relationship of the negative/positive tread or road contact surface is uniformly distributed in a balanced manner in the central tread region, while it is greater to the advantage of the positive proportion in the shoulder region. As a result of the intentionally distorted slanted meandering of the profiled ribs, edges, notches or grooves, and rib bridges located therebetween, follow one another in direct sequence, extending to the right and to the left and at an incline to each other.

This structuring or dividing is furthermore reinforced by the continuous zig-zag profile of the circumferential grooves with the laterally adjoining blind grooves of different slanted or inclined orientation. This groove system represents a water-receiving and water-dissipating system (water drainage) effective or operating essentially in the circumferential direction, which is particularly effective to function in a safe manner with its tread or road-contact surface which is broadened in the axial direction yet shortened in the circumferential direction, and considerably improves the hydroplaning behavior.

Additionally, a continuous tying together of block-rib parts is provided by the meandering rib shape, resulting in an advantageous low noise development. The noise generated not only by natural vibration but also by chassis excitation is very low.

The blind grooves extend at an angle to the circumferential direction, and are sufficiently long. These grooves contribute to the improved drainage of the tread. The closed ends of the grooves terminate in an inclined configuration for reasons of strength and stability. Furthermore, the meandering character also is maintained in the shoulder-transition regions at the start of the side walls. Additionally, a groove for comfort or flexing purposes is provided in this region which is continuous in the circumferential direction. Thrust forces, which are effective from the side walls in a direction toward the tread, are advantageously taken up by this groove and are passed along in a favorably distributed manner.

According to specific embodiments of the present invention, the blind grooves of a given rib, which grooves are arranged at an angle, extend in opposite directions. The central tread region may have two meandering profiled ribs which, in the circumferential direction, are displaced relative to each other by at least a half of the meandering portion, i.e., by at least half of the repeat distance of a given portion of the ribs. The tread shoulder regions may respectively be provided with a meandering profiled rib, that block rib part of which facing the central tread portion having larger raised surfaces, which preferably are at least twice as large as those of the central ribs. The block rib part may form the tire shoulder, and that profiled rib part thereof determined by the blind grooves, which extend at an angle and opposite to each other, may essentially be provided in the shoulder-curvature region. The angles of the toothed arrangement on the outer side edges of the profiled ribs may range from 100° to 160°, preferably 120°. The path of the inclination of the blind grooves may range from 65° to 85° relative to the circumferential middle line. The inclined path of the grooves relative to each other, particularly between grooves of a given rib, may be different. The blind grooves may extend beyond the center line of a given profiled rib. At least the blind grooves extending from the main tread to the tire shoulders may be approximately twice as long as the remaining grooves. The closed ends of the blind grooves may be inclined or slopelike, i.e., the closed ends do not extend at right angles to the tread surface.

The ribs or rib parts located in the tire-shoulder curvature region may adjoin a common groove extending continuously in the circumferential direction and intended for flexing or comfort purposes. A meandering decorative rib may be located radially below the flexing groove. The profiled ribs and the decorative ribs may be provided with very fine cuts or slits, so-called lamellar fine slits. The rib edges may be at least partially embodied with an inclined, chambered or beveled configuration.

Referring now to the drawing in detail, the tread profile 1 comprises meandering ribs, of which the ribs 2 and 3 are located in the center region 4 of the tread, and the ribs 5 and 6 are respectively located in the shoulder regions 7, 8. The meandering ribs are separated from each other by zig-zag shaped circumferential grooves 10, 11, 12.

Included as characteristic for the meandering ribs is their meandering course, the saw-tooth-like serrated arrangement 15 along the outer side edges 13, 14, and the distorted, inclined arrangement of the inner contour, which is determined by the linear, inclined blind grooves 16, 17 in the ribs 2, 3, and blind grooves 22, 23 in the ribs 5, 6. With regard to a given tread rib, the blind grooves are oriented at an incline, alternately rising to the right and to the left, alternating from the right and left side edges. Characteristic rib parts 18 and 19 result from this subdivided distribution, with the surface shape of the rib parts 18 and 19 resembling an inclined gable or an oblique gable wall. Determinative for the function of these ribs is the fact that a plurality of edges, block-rib parts, and groove portions is effective in the raised or road-contact surface area, which extends in all essential directions. This distorted toothed meandering is determinative for the previously mentioned improved properties of the tread of the tire of the present invention.

The length of the blind grooves 16, 17 is extended beyond the center line 20 of the ribs. The closed end 26 is preferably embodied in a beveled or inclined manner, as apparent from FIG. 2. The meandering ribs 5, 6 of the shoulder regions 7, 8 are larger in the positive raised surface or tread area 21 for wear reasons. Consequently, this rib has a definite block character. The blind groove 22 for this reason is extended or made longer. The road-contact surface of the tread terminates approximately at the imaginary line 25. The rib part 24, containing the end parts of the groove 22 as well as the groove 23, is already located in the shoulder-curvature region 27. A groove 30, which is provided for flexing or comfort purposes and extends continuously in the circumferential direction, is located in the shoulder transition zone contiguous with the region 27. A likewise meandering decorative rib 31 is arranged radially adjacent thereto.

The various tread ribs 2, 3, 5, 6, 31 may also be provided with very fine cuts or slits 32, i.e., with so-called lamellar fine slits.

The pneumatic tire illustrated in FIG. 2 is a radial tire with belt-like reinforcement of the tread. The pneumatic tire is preferably embodied as an SR-type, and has a height-width ratio of 0.7/1.

The present invention is, of course, in no way restricted to the specific disclosure of the specification and drawing, but also encompasses any modifications within the scope of the appended claims. In particular, it should be noted that the respective blind grooves in the various tread ribs may be oriented so as to be inclined to the circumferential direction of the tire at an angle which is substantially opposite to the angle of inclination of the corresponding blind grooves of FIG. 1.

What we claim is:

1. A tread profile for a pneumatic vehicle tire having a main tread and tire shoulders including respective shoulder regions and sidewalls, said tread having a central region extending in the circumferential direction of said tire between said shoulder regions with shoulder-block formation, said tread profile comprising in combination therewith a plurality of meandering profiled ribs both in the central region and shoulder regions including at least two narrow ribs extending continuously in the circumferential direction of said tire, and a plurality of continuous circumferential grooves including at least three grooves located peripherally which separate said profiled ribs from one another, said ribs having side edges formed by said grooves, said side edges being toothed in outline and obtuse-angled; extending into said ribs from said grooves are blind grooves which are all very deep even in central and shoulder regions and which are all oriented at an angle to the circumferential direction of said tire and have closed ends that terminate in an inclined configuration for reasons of strength and stability, block-rib parts being formed between said side edges of said ribs and respective closed ends of said blind grooves, said block-rib parts having tread surfaces and an inclined triangular-wall-shaped lengthened meander side edge configuration of blocks existing for the shoulder-block formation having more extensive edge length by being inclined without leading disadvantageously to block tear-out damage, the shoulder regions being provided with a meandering profiled rib, that block-rib part of which facing the central region having larger raised surfaces which are at least twice as large as those of the ribs of the central region and said circumferential grooves having a corresponding zig-zag shape, and furthermore in a given profiled rib, which has two side edges, said blind grooves extending into said rib from both of said side edges, so that the blind grooves extending into said rib from one of said side edges extending toward said central region of said tread, and the blind grooves extending into said rib from the other of said side edges extending in the opposite direction, namely away from said central region of said tread, the length of these blind grooves extending beyond a center line of the ribs associated therewith, said blind grooves respectively representing a water-receiving and water-dissipating system of tread drainage by the blind grooves effective essentially in circumferential direction and particularly effective to function in a safe manner with tread road contact broadened in axial direction yet shortened in circumferential direction considerably to improve hydroplaning behavior accompanied by low noise development due to continuous tying together of said block rib parts, at least said blind grooves extending from the main tread to the tire shoulders being approximately twice as long as the remaining blind grooves.

2. A tread profile in combination according to claim 1 in which said central region of said tread includes only two of said profiled ribs which, in the circumferential direction of said tire, are displaced relative to each other by at least half of the repeat distance of a given portion of one of said ribs.

3. A tread profile in combination according to claim 1, in which that block-rib part of said shoulder ribs which faces said central region of said tread forms said tire shoulder, the remaining rib parts of said shoulder ribs forming a shoulder-curvature region between said shoulder and said tire side wall.

4. A tread profile in combination according to claim 3, in which said obtuse angle of said toothed side edge outline is in a range from 100° to 160°.

5. A tread profile in combination according to claim 4, in which said obtuse angle is specifically 120°.

6. A tread profile in combination according to claim 4, in which said blind grooves extend at an angle in a range of 65° to 85° to the circumferential direction of said tire.

7. A tread profile in combination according to claim 6, in which said blind grooves extend at different angles relative to said circumferential direction of said tire.

8. A tread profile in combination according to claim 7, in which said blind grooves of a given rib extend at a different angle to the circumferential direction of said tire than that of said blind grooves of another rib.

9. A tread profile in combination according to claim 7, in which, starting from a side edge of a given rib, said blind grooves extend beyond the middle of said rib.

10. A tread profile in combination according to claim 9, in which at least those blind grooves which are located in said shoulder ribs and extend into said shoulder rib away from said central region of said tire are approximately twice as long as the remaining blind grooves of said tread profile.

11. A tread profile in combination according to claim 10, in which said closed ends of said blind grooves are inclined.

12. A tread profile in combination according to claim 11, in which those rib parts located in a respective shoulder curvature region extend from a common continuous circumferential groove intended for flexing and comfort purposes.

13. A tread profile in combination according to claim 12, which includes respective meandering decorative ribs located radially outwardly of said flexing grooves.

14. A tread profile in combination according to claim 13, in which all of said meandering ribs are provided with lamellar fine slits.

15. A tread profile in combination according to claim 14, in which said side edges of said ribs are at least partially chamfered.

16. A tread profile according to claim 1, in which said blind grooves extend substantially linearly into said ribs.

* * * * *